United States Patent [19]

Aidlin et al.

[11] 4,343,587

[45] Aug. 10, 1982

[54] MACHINE FOR HORIZONTAL TRANSPORTATION OF CONTAINERS

[75] Inventors: Stephen H. Aidlin, West Hempstead; Michael Tartokowsky, Rego Park, both of N.Y.

[73] Assignee: Aidlin Automation, Inc., Brooklyn, N.Y.

[21] Appl. No.: 9,597

[22] Filed: Feb. 5, 1979

[51] Int. Cl.³ .............................................. B66B 17/00
[52] U.S. Cl. ................................. 414/568; 198/488; 414/222
[58] Field of Search ................ 198/488; 414/222, 421, 414/224, 420, 567, 787, 568, 728, 742, 754, 749, 750

[56] References Cited

U.S. PATENT DOCUMENTS

| | | | |
|---|---|---|---|
| 1,253,748 | 1/1918 | Tyson | 414/568 |
| 1,583,428 | 5/1926 | Soubier | 414/568 X |
| 3,198,309 | 8/1965 | Ogawa | 198/488 |
| 3,601,272 | 8/1971 | Black | 414/222 |
| 4,193,727 | 3/1980 | Kesselring | 414/728 X |

*Primary Examiner*—Lawrence J. Oresky

*Attorney, Agent, or Firm*—Erwin S. Teltscher

[57] ABSTRACT

A transport machine includes a frame for cyclically receiving a plurality of containers from an unloading station and for transporting them to the discharge region. The discharge region is spaced apart from the unloading station by a predetermined distance. The machine includes a platform connected to the frame, and is operable in a first position thereof adjacent the unloadiing station for accepting the containers, and pivotably movable thereafter about an axis to a second position angularly spaced away from the unloading station; it is movable subsequently from the second position to a third position adjacent the discharge region for temporarily storing the containers thereat; the platform is operable thereafter, and upon having temporarily stored the containers at the third position, to move to a fourth position spaced away from the discharge region, and similar to said second position, and thereafter operable to execute a pivotable return movement from the fourth position to the first position. A control device is connected to the platform for controlling the operation thereof.

10 Claims, 3 Drawing Figures

MACHINE FOR HORIZONTAL TRANSPORTATION OF CONTAINERS

BACKGROUND OF THE INVENTION

The increasing use of plastic bottles in the soft drink industry has brought about a concomittant use of machinery to handle the bottles in the course of their manufacture and processing, prior to being automatically filled with soft drinks.

One item of machinery required in that process is a bottle-transporting device which accepts containers or bottles from a source, and transports the bottles in predetermined alignment to a discharge region for further processing, for example for being received therefrom by a conveyor belt.

The present invention is concerned with the implementation of such a conveying device, specifically tailored for the task at hand.

SUMMARY OF THE INVENTION

It is accordingly one of the objects of the present invention to create a bottle-transporting or conveying device of the above type which is capable of operating at a required production speed of handling one half a dozen bottles in 20 seconds, or 18 bottles per minute. The above objective is attained, according to the present invention, by providing a machine including a frame for cyclically receiving a plurality of containers from an unloading station and for transporting them to the discharge region, the discharge region being spaced apart from the unloading station by a predetermined distance. The machine includes a platform connected to the frame, and is operable in a first position thereof adjacent the unloading station for accepting the containers, and pivotably movable thereafter about an axis to a second position angularly spaced away from the unloading station, and is movable subsequently from the second position to a third position adjacent the discharge region for temporarily storing the containers thereat, the platform being operable thereafter, and upon having temporarily stored the containers at the third position, to move to a fourth position spaced away from the discharge region, and similar to said second position and thereafter operable to execute a pivotable return movement from the fourth position to the first position. Control means are connected to the platform for controlling the operation thereof.

It is preferable if the machine includes drive means for moving the platform from the first position to the fourth position, through the second and third positions; the drive means, in turn, are operable by the control means.

In one version of the invention the drive means include pneumatically operable means, and the unloading station includes a chute; the platform is adapted to receive the containers from the chute in the first position.

It is advantageous if detecting means are connected to the chute for sensing when a prearranged number of the containers have been loaded thereonto, and for thereafter commanding the drive means to move the platform from the first position to the second position.

The detecting means preferably include a light source attachable at the interior of the chute to one side thereof for beaming a light beam to its other side, a reflector disposed at the other side for reflecting the light beam from the light source towards the light source, and a photoelectric detector securable to the one side, for sensing the presence of the reflected light beam, whereby the presence of the reflected light beam senses the absence of any containers in the chute, and triggers the drive means to initiate the motion of the platform from the first position to the second position.

It is advantageous if the control means include a first switch disposed on the frame, and actuable by the platform upon the platform reaching the second position, for commanding the drive means to move the platform forward from the second position to the third position, a second switch disposed on the frame and actuable by the platform upon the platform reaching the third position, for commanding the drive means to move the platform from the third position to the fourth position, and a third switch disposed on the frame actuable by the platform upon the platform reaching the fourth position for commanding the drive means to return the platform from the fourth position to the first position. It is preferable if the machine includes pivoting means for enabling the platform to pivotably move from the first position to the second position, and from the fourth position to the first position.

It is advantageous if the platform includes a plurality of walls substantially forming individual compartments for storing the containers therein, respectively, when the platform occupies the first, second and third positions, and if the containers are released from the compartments when the platform moves from the third position to the fourth position.

It is advantageous if guide means are secured to the frame for guiding the platform from the second position to the third position, and from the fourth position to the first position. It is preferable if the frame includes two guide shafts, and if the guide means include two hollow sleeves secured to the platform which are slidable on the guide shafts, respectively, and if the drive means include two wheels rotatably mounted on the frame but connected by an endless cable, and if the endless cable is connected to the platform for operably moving it.

It is advantageous if the guide means include two guide rails for restraining the containers from any motion in a plane substantially at right angles to the longitudinal container axis and to a line connecting the second and third positions.

A method of cyclically transporting a predetermined number of containers by a platform from an unloading station to a discharge region includes the steps of:

(a) unloading the containers from the unloading station to the platform, (b) moving the loaded platform from a first position adjacent the unloading station to a second position spaced away from the unloading station, (c) moving the platform from the second position to a third position adjacent the discharge region, (d) discharging the containers at the discharge region, (e) thereafter moving the empty platform from the third position to a fourth position spaced away from the discharge region, (f) thereafter returning the platform to the first position, and (g) thereafter cyclically repeating steps (a) through (f) until the predetermined number of containers has been transported from the unloading station to the discharge region.

It is advantageous if step (b) comprises the step of pivoting the loaded platform from the first position to the second position, and if step (e) comprises the step of pivoting the empty platform from the third position to the fourth position.

BRIEF DESCRIPTION OF THE DRAWING

The invention will be better understood with the aid of the accompanying drawing, in which.

DESCRIPTION OF THE PREFERRED EMBODIMENT

Figure 1:
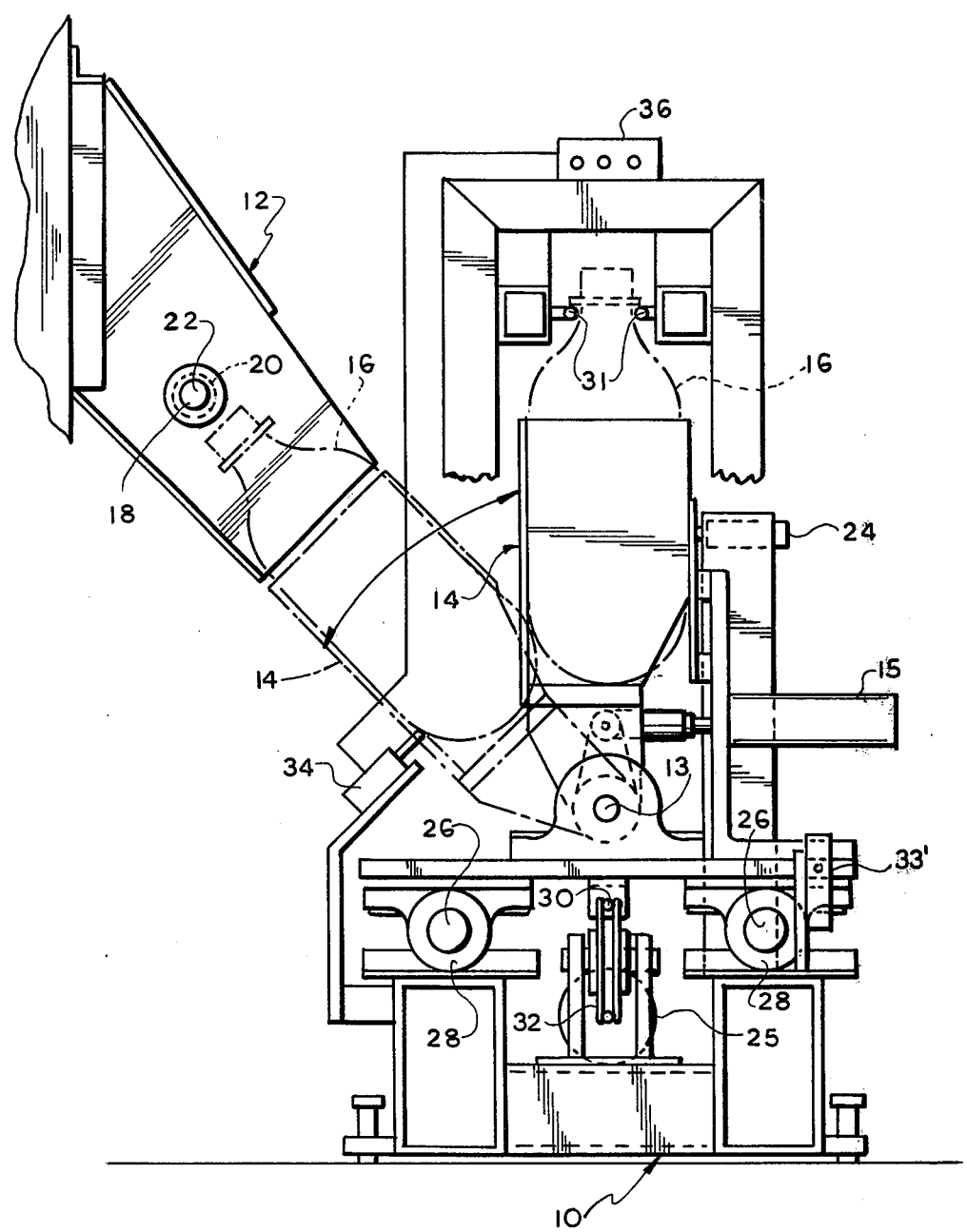
FIG. 1 is an endview of the machine, according to the present invention.
Figure 2:
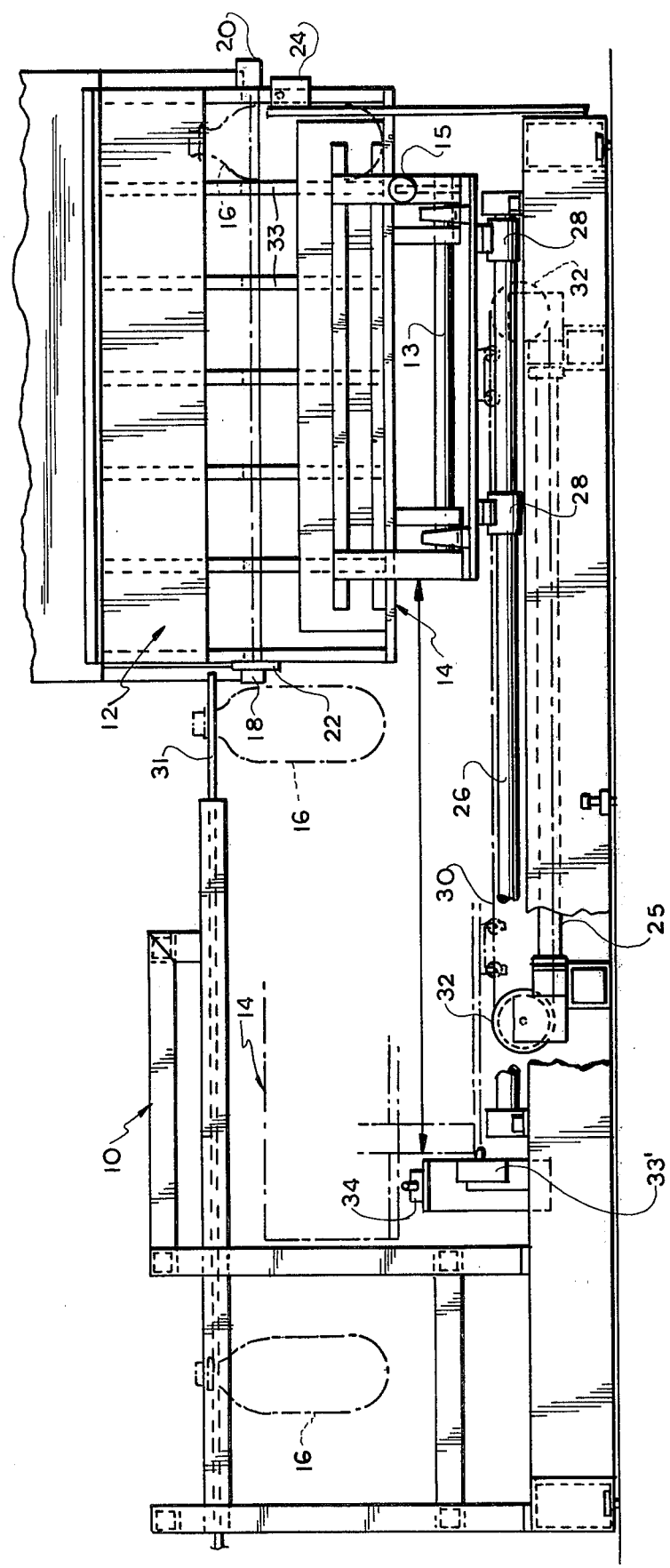
FIG. 2 is an elevational view of the machine.
Figure 3:
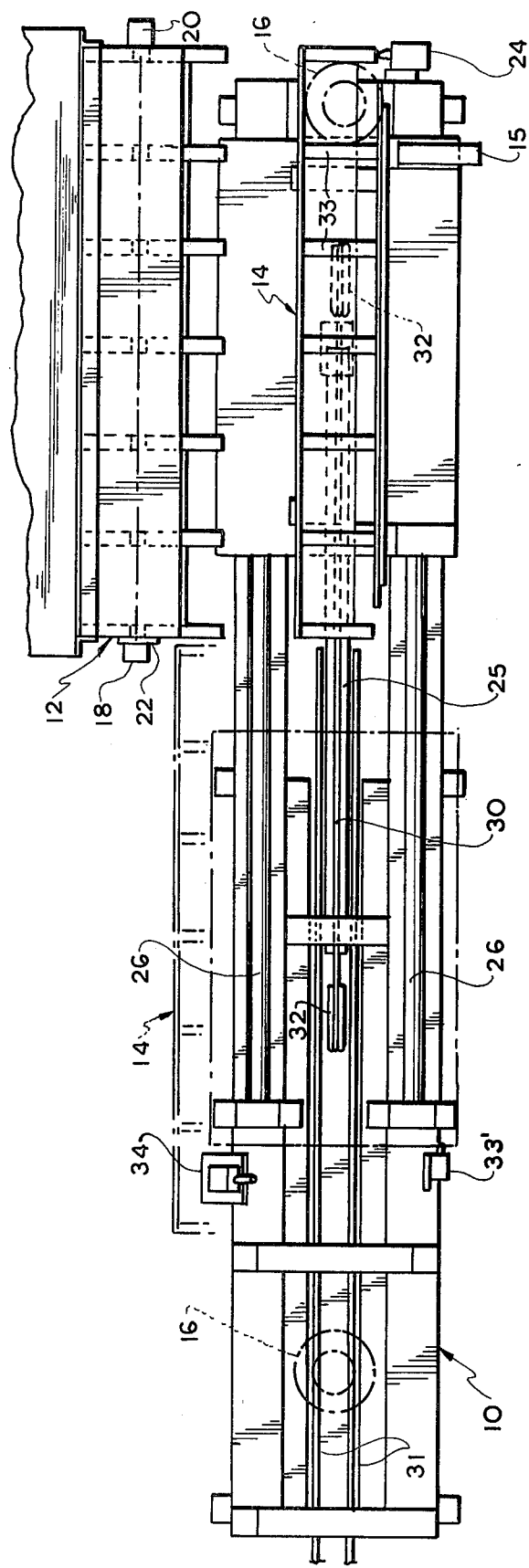
FIG. 3 is a plan view of the machine.

Referring now to the drawing, there is shown a frame 10, near which there is disposed a chute 12. Pivoted reciprocally about a shaft 13 mounted on the frame 10 is a platform 14, which is also movable in a translatory manner on the frame 10. The platform 14 is normally capable of holding up to six containers 16, such as plastic bottles, if desired. The bottles 16 are loaded from a non-illustrated source into the chute 12, and therefrom onto the platform 14; when the platform 14 is fully loaded, i.e. in the present case, when six bottles have been loaded onto the platform 14 detecting means, such as, a light sensing device senses the absence of any containers in the chute 12. The light sensing device consists of a light source 18 for beaming a light beam across the width of the chute 12, a reflector 20 for reflecting the light from the other end of the chute 12 towards the source 18, and a photodetector 22, disposed near the light source 18, for receiving the reflected light, and for converting the reflected light into electrical signals. The presence of the electrical signals, signifying that the chute 12 is empty of any containers 16, and that all the containers 16 have therefore been loaded onto the platform 14, can be used to initiate a pivoting motion of the platform 14 by suitable drive means, e.g. pneumatically operated drive means including an air cylinder 15. A detailed description of the pneumatically operated drive means will not be given here, as the operation of such pneumatically-operated drive means is well known. As the platform 14 is pivoted from a first position, shown in dash-dot lines in FIG. 1, in which the platform is inclined about 45° from the vertical, towards a vertical, or second position, shown in full lines in FIG. 1, on the frame 10, the pivoting motion of the platform 14 causes it to abut and actuate a switch 24, including a non-illustrated solenoid, which initiates the translatory motion of the platform 14, driven, for example, by the pneumatic drive means including a cylinder 25, from the second position, shown in FIGS. 2 and 3 in full lines at the right side, to the third position of the platform 14, shown in FIGS. 2 and 3 in dash-dot lines at the left side. The platform 14 travels from its second to its third position on stationary guide rails or guide shafts 26, which pass through movable sleeves 28 secured to the platform 14. During this travel the containers 16 are also guided on rails 31, which rails restrain the containers 16 from any lateral motion. The platform 14 is also partitioned by walls 33, each container 16 being bounded on opposite sides by respective walls 33 during the forward travel of the platform 14 from its second to its third position. The platform 14 is moved by an endless cord 30, to which it is attached; the endless cord 30, in turn is wrapped around two wheels 32, rotatably mounted on the frame 10. On reaching the third position, the platform 14 abuts a switch 33', which initiates a pivoting motion of the platform 14 in a counterclockwise sense via the drive means to a fourth position, which is shown in FIG. 1. This pivoting motion withdraws the walls 33 of the platform 14 from adjoining containers 16, so that the containers 16 are now no longer restrained to remove within the compartments of the platform 14, bounded by respective walls 33. Just before reaching that fourth position, the platform 14 abuts a switch 34, which initiates the return motion of the platform 14 from its fourth position shown on the left of FIGS. 2 and 3, towards its first, or initial position shown on the right of FIGS. 2 and 3, the return motion of the platform 14 being powered by the drive means, which includes the air cylinder 25. A control box 36, mounted on top of the frame 10, controls and synchronizes the various controlled movements of the cylinders, such as the cylinder 15, responsible for the reciprocally pivotable motion of the platform 14, and the cylinder 25, controlling the reciprocal translatory motion of the platform 14. It should be noted that in FIG. 1 the full lines also show platform 14 in the third position, and that the dash-dot lines show it also in the fourth position.

It will be further apparent that numerous variations and modifications may be made in the apparatus of the present invention, by any one skilled in the art, in accordance with the principles of the invention hereinabove set forth, and without the exercise of any inventive ingenuity.

What is claimed is:

1. A machine including a frame and means for cyclically receiving a plurality of containers from an unloading station, and for transporting them to a discharge region, said discharge region being spaced apart from said unloading station by a predetermined distance, comprising in combination:

a platform connected to said frame, being operable in a first position thereof adjacent said unloading station for accepting said containers, pivoting means, including pivotal movement means for tilting said platform from an upright position to a tilted position, and righting it from said tilted position to said upright position, linear movement causing means for moving said platform between said first position and a position linearly spaced from said unloading station, said platform being pivotably movable after having accepted said containers by said pivotal movement means about an axis to a second position angularly spaced away from said unloading station, movable subsequently from said second position by said linear movement causing means linearly to a third position adjacent said discharge region for temporarily storing said containers thereat, said platform being operable thereafter by said linear movement causing means, and upon having temporarily stored said containers at said third position, to linearly move to a fourth position spaced away from said discharge region and similar to said second position, and operable thereafter by said pivotal movement means to execute a pivotable return movement from said fourth position to said first position, and control means connected to said platform for controlling the operation thereof.

2. A machine according to claim 1, wherein said linear movement causing means include drive means for moving said platform from said first position to said fourth position through said second and third positions, said drive means being operable by said control means.

3. A machine according to claim 2, wherein said drive means includes pneumatically operable means, and further comprising said unloading station, said unloading station including a chute, and wherein said platform is adapted to receive said containers from said chute in said first position.

4. A machine according to claim 3, further comprising detecting means connected to said platform for sensing when a prearranged number of said containers has been loaded thereinto, and for thereafter commanding said drive means to move said platform from said first position to said second position.

5. A machine according to claim 4, wherein said detecting means includes a light source attached at the interior of said chute to one side thereof for beaming a light beam to its other side, a reflector disposed at said other side for reflecting said light beam towards said light source, and a photoelectric detector securable to said one side for sensing the presence of the reflected light beam, wherby the presence of the reflected light beam senses the absence of any containers in said chute and triggers said drive means to initiate the motion of said platform from said first position to said second position.

6. A machine according to claim 4, wherein said control means include a first switch disposed on said frame and actuatable by said platform upon said platform reaching said second position for commanding said drive means to move said platform forward from said second position to said third position, a second switch disposed on said frame and actuatable by said platform upon said platform reaching said third position for commanding said drive means to move said platform from said third position to said fourth position, and a third switch disposed on said frame actuatable by said platform upon said platform reaching said fourth position for commanding said drive means to return said platform from said fourth position to said first position.

7. A machine according to claim 1, wherein said platform comprises a plurality of walls substantially forming individual compartments for storing said containers therein, respectively, when said platform occupies said first, second and third positions, and wherein said containers are released from said compartments upon said platform moving from said third position to said fourth position.

8. A machine according to claim 1, further comprising guide means secured to said frame for guiding said platform from said second position to said third position, and from said fourth position to said first position.

9. A machine according to claim 8, wherein said frame includes two guide shafts, and said guide means includes two hollow sleeves secured to said platform and slidable on said guide shafts, respectively, and wherein said drive means includes two wheels rotatably mounted on said frame, and connected by an endless cable, said endless cable being connected to said platform for operably moving the latter.

10. A machine according to claim 8, wherein each of said containers has a longitudinal axis, and wherein said guide means further include two guide rails for restraining said containers from any motion in a plane substantially at right angles to said axis and to a line connecting said second and third positions.

* * * * *